Sept. 28, 1971               C. A. STATON               3,608,162
VENTED CORE AND MOLD ASSEMBLY FOR CONCRETE
BLOCK MOLDING MACHINES
Filed Dec. 13, 1968
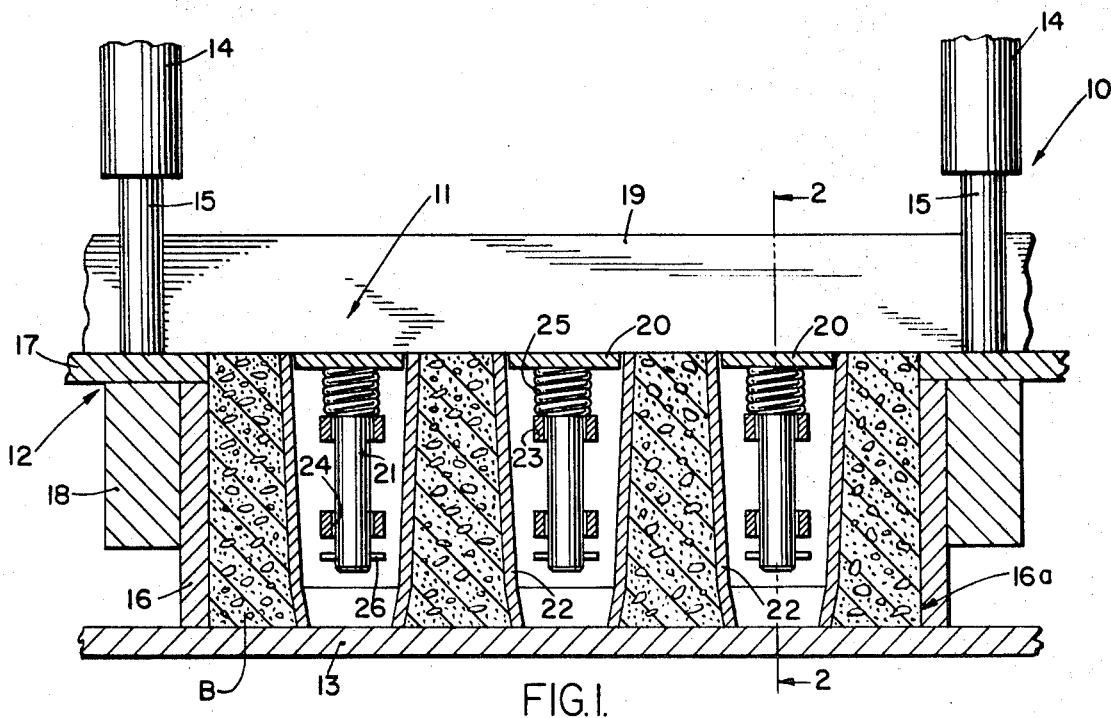
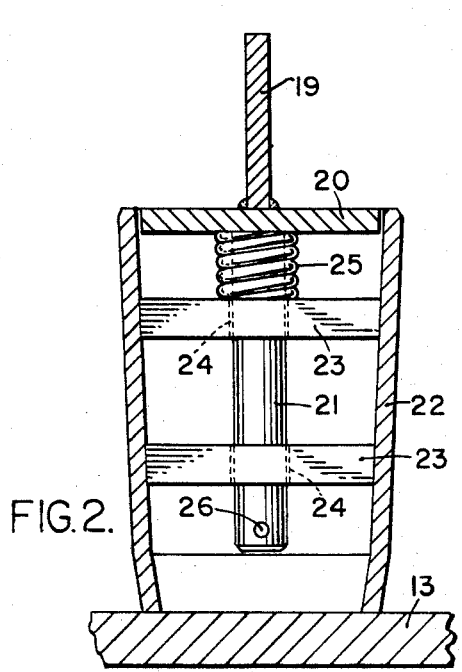
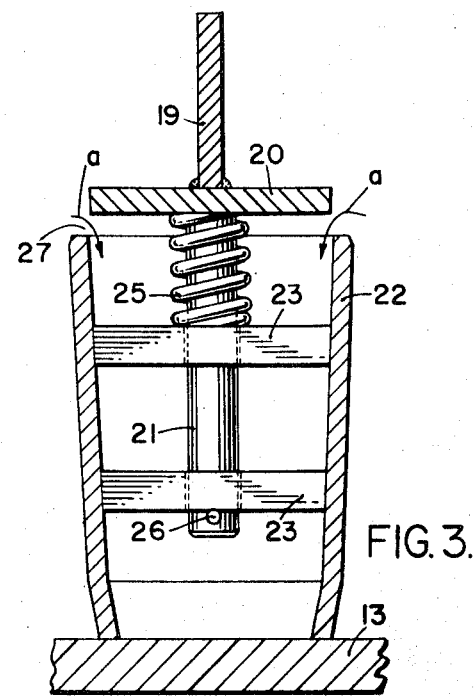
INVENTOR
CHARLES A. STATON
BY Searman Searman
& McCulloch
Attorneys

United States Patent Office 3,608,162
Patented Sept. 28, 1971

3,608,162
VENTED CORE AND MOLD ASSEMBLY FOR CONCRETE BLOCK MOLDING MACHINES
Charles A. Staton, Alpena, Mich., assignor to
Besser Company, Alpena, Mich.
Filed Dec. 13, 1968, Ser. No. 783,655
Int. Cl. B28b 7/18
U.S. Cl. 25—41A            8 Claims

ABSTRACT OF THE DISCLOSURE

A vnted core and mold assembly for concrete block molding machines wherein a core plate which is vertically separable from a mold box supporting pallet has core shell covers fixed thereto which support core shells for relative vertical movement therewith, vertical separation of the core plate causing a vertical separation of the core cover plates and core shells which are restrained by the frictional resistance of the cementitious material in the mold box and the vacuum created by the withdrawal of the core shells to thus open up the tops of the core shells to atmospheric pressure and break the vacuum created.

---

One of the prime objects of the present invention is to provide a relatively simple and reliable unitary core and mold assembly wherein the suction forces created upon relative separation of the core shells and mold box from the pallet are utilized to relatively separate cover members from the core shells and thereby admit vacuum-breaking air to the interior of the core shells so that they can be easily withdrawn without crumbling the green block formed in the mold box.

A further object of the invention is to provide an assembly of the character described which may be utilized in existing block molding machines without requiring any redesign thereof and can be, in fact, incorporated more economically than present assemblies.

Still a further object of the invention is to provide a vented core mold assembly which utilizes the vacuum forces created to meter just the amount of air needed to break the vacuum to the interior of the core shells.

Other objects and advantages of the invention will be pointed out specifically or will become apparent from the following description when it is considered in conjunction with the appended claims and the accompanying drawings, in which:

FIG. 1 is a sectional side elevational view through the core and mold box assembly;

FIG. 2 is an enlarged, sectional, side elevational view taken on the line 2—2 of FIG. 1 and illustrating the core assembly only in a normal condition in which the core shell cover substantially closes the upper end of the core shell shown; and FIG. 3 is a view similar to FIG. 2 and illustrating the core plate in a position vertically separated from the pallet, the core shell cover being shown in an elevated position relative to the core shell to admit vacuum-breaking air to the interior of the core shell.

Referring now more particularly to the accompanying drawings wherein a preferred embodiment of the invention only is shown, a numeral 10 generally indicates the vented core and mold assembly of the invention, and it is to be understood that the assembly 10 may be utilized with the molding machine elements shown in Vander Heyden, U.S. Pat. No. 2,587,413, or Besser U.S. Pat. No. 2,319,291. The invention may be utilized in a molding machine of the type in which the pallet and finished article are lowered from the mold or in a machine of the type in which the mold and core assembly are raised from the pallet and "green" block. The concept to be described would also have utility in a machine wherein the vented core assembly was vertically separable from the mold box.

In the machine assembly to be described it may be assumed that the core assembly, generally designated 11, and mold box assembly generally designated 12, are connected together for relative vertical separation from the pallet plate 13 by pneumatic or hydraulic cylinders 14, having rams 15 connected to the mold box assembly 12 to raise the entire assembly 10 once the "green" cement block B is formed within the mold box assembly 12. As shown, the rectangular mold box assembly 12 includes side walls 16 supported by upper plates 17 and rails 18, and it is to be understood that the rectangular enclosure 16a formed is open at its upper and lower ends.

The core assembly 11 includes a core plate 19 fixed to the mold box plates 17 and it will be observed that a series of cover plates 20 are welded to the plates 19, and that posts or shafts 21, fixed to the plates 20, depend from the plates 20. The posts 21 provide support for the tubular core shells 22 which may be of any desired configuration, in a manner which permits relative separation of the core shell cover plates 20 from core shells 22. The core shells 22 are usually oblong in cross-sectional shape and taper downwardly, as shown, to facilitate their withdrawal from the "green" block B which is formed in the mold enclosure 16a. Provided within the core shells 22 and fixed to opposite side walls thereof are bridging plates 23, having guide openings 24 which freely pass the posts 21. It will be observed that a coil spring 25 surrounds each post 21 and has its upper and lower ends respectively connected to the cover plate 20 and upper bridging member 23 in any suitable fashion, such as by welding the ends of the spring to these members. The coil springs 25 are normally in the positions illustrated in FIG. 2 and yieldably vertically support the upper bridging plates 23 and core shells 22 stops pins 26 are fixed to the lower ends of the posts 21, in a predetermined position as shown, so as to engage the undersides of the lower bridging members 23 when the plate 19 is moved from the position illustrated in FIG. 2 to the position illustrated in FIG. 3 to prevent further extension of the springs 25.

In operation, and with a pallet 13 in position beneath the core and mold box assembly 10, the cylinders 14 are operated to move the assembly 10 downwardly to the position illustrated in FIG. 2 in which the mold box 16 and core shells 22 engages the pallet 13. Cementitious material is dumped into the mold box 16 by a hopper in the manner disclosed in the United States patents mentioned, which are incorporated herein by reference, and fills the mold box 16a around the core shells 22. In present day machines the assembly is then vibrated to compact the concrete and form the block B, but of course, it would also be possible to use tamping members to compact the cementitious material if desired. Once the "green" block B is formed in the desired manner, the frame supported cylinders 14 are operated to retract the rams 15 and raise the assembly 10. The cementitious material tends to exert a frictional drag on the core shells 22. As a result of the drag force and the force of the vacuum created within the core shells 22 by lifting of the core shells 22, the plates 20 move upwardly relative to the core shells 22 to reduce the pressure within the shells 22, springs 25 being stretched in the process, as shown in FIG. 3. The suction forces, which would otherwise build within the cavities of the shells 22, and have a tendency to crumble the walls of the block B, are relieved by the air flowing in between the cover 20 and core shells 22 as indicated in FIG. 3 by the arrows a. When the core shells 22 clear the upper end of the block B the springs 25 restore the cover plates 20 to the closed position in which they are shown in FIG. 2. Since the cover plates 20 are separated by the vacuum forces created, and thus are relieved automatically, the amount of air required to break them is metered through the enlarged perimetrical opening 27, which is created, and only as much air as is needed enters the shells 22.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. A vented core and mold assembly for use with a concrete block forming machine comprising: a mold box which is open at its upper and lower ends, a pallet closing the lower end thereof, projecting tubular core shell means open at upper and lower ends thereof and engageable, at the lower end thereof, with said pallet; cover means for closing the upper end of said core shell means; means mounting said cover means for movement upwardly, relative to the block being formed and including means connecting said cover means and said core shell means for movement between a first position in which said cover means is removed from said core shell means to admit air from said upper end of said core shell means to the lower end thereof and a second less removed position; and resilient means connected between said cover means and said shell means normally urging said cover means to said second position.

2. A vented core and mold assembly for concrete block molding machines comprising: an enclosing mold box open at the upper and lower ends thereof; a pallet on which the lower end of said mold box is adapted to rest; a core shell mounting means having at least one dependent hollow core shell supported thereon with an opening at the upper end thereof; a cover plate for substantially closing the opening in said core shell and fixed to said core shell mounting means and movable between a position substantially closing said opening and a removed position in which said opening is relatively uncovered for substantial air flow through to the interior of said core shell; means connected with said cover plate and supporting said shell for a predetermined vertical movement relative thereto including yieldable means normally biasing said cover plate to the closing position; and means for effecting the relative vertical separation of said core shell mounting means and said pallet to withdraw said core shell and create a vacuum within said core shell whereby the cementitious material in the mold box exerts a core shell restraint and said cover plate is moved to said second position to admit air to break the vacuum created.

3. The combination defined in claim 2 wherein said cover plate is shaped to fit the upper end of said core shell and said opening is perimetrical.

4. The combination defined in claim 2 including a member bridging said shell and including a vertical opening; said core shell supporting means including a dependent post connected to said cover plate and slidably received in said vertical opening; stop pin means on said post; and said biasing means comprising spring means around said post and fixed between said bridging members and said cover plate to restore said cover plate to said closing position.

5. A vented core and mold assembly for concrete block molding machines comprising; a mold box within which cementitious material is poured to form a block; pallet means for closing one end of said mold box; core shell support means having projecting hollow core shells, said core shells having openings therein and being receivable in said mold box; means for relatively moving said core shell support means and said pallet means between adjacent and removed positions to relatively move said core shells and said pallet means between engaged positions and removed positions; means for normally covering said openings when said core shells and said pallet means are in said engaged positions; and means connecting said core shells and said covering means for relative movement in a manner so that said openings are uncovered by the restraining forces tending to hold said core shells in the block formed when said shell core support means and said pallet means are relatively separated.

6. The combination defined in claim 1 in which said yieldable means comprises spring means.

7. The combination as set forth in claim 1 wherein said means connecting said cover means and said core shell means comprises a member spanning said shell means and including an opening therein, a post connected to said cover means and extending within said core shell means and slidably received within said opening.

8. The combination as set forth in claim 7 further including stopping means on said posts for engaging said spanning members after a predetermined relative movement between said core shell means and said cover means; said yieldable means comprising spring means around said post and fixed between said spanning member and said cover means to restore said cover means to said less removed position.

References Cited
UNITED STATES PATENTS

| | | | |
|---|---|---|---|
| 2,276,558 | 3/1942 | Zuber | 249—176X |
| 2,524,744 | 10/1950 | Zeverly | 249—176 |
| 1,212,997 | 1/1917 | Pate | 249—177X |

J. SPENCER OVERHOLSER, Primary Examiner

J. S. BROWN, Assistant Examiner

U.S. Cl. X.R.

25—41G